United States Patent Office

3,554,978
Patented Jan. 12, 1971

3,554,978
HEXAFLUORO CATALYTIC ADDITIVES FOR FIRST AND SECOND STAGE OF DIRECT ESTERIFICATION METHOD OF PREPARING POLYESTERS
Mary E. Carter, Philadelphia, and John A. Price, Swarthmore, Pa., and Robert P. Mervine, Claymont, Del., assignors to FMC Corporation, Philadelphia, Pa., a corporation of Delaware
No Drawing. Filed Aug. 30, 1967, Ser. No. 664,263
Int. Cl. C08g 17/015
U.S. Cl. 260—75       12 Claims

ABSTRACT OF THE DISCLOSURE

Process of preparing polyethylene terephthalate resin comprising carrying out both a direct esterification reaction between ethylene glycol and terephthalic acid and polycondensing the resulting product thereof in the presence of a hexafluoroantimonate, hexafluoroarsenate, hexafluorotitanate, tetrafluoroantimonite, or tetrafluoroarsenite compound.

---

This invention relates to a method of preparing polyesters and more particularly to a method of preparing polyethylene terephthalate having excellent filament-forming properties through the use of an improved catalytic additive.

In general, the preparation of filament-forming polyesters from a dicarboxylic acid and a diol by the direct esterification process is well-known in the art. Generally, in the preparation of such polyesters, the dicarboxylic acid and glycol are first combined and subjected to a direct esterification reaction in the presence of a suitable first stage additive or ether inhibitor. The resulting product or prepolymer is then polycondensed in the presence of a polycondensation catalyst to form the polyester resin. However, this process has achieved only limited commercial success due to the fact that the reaction proceeds relatively slow and is generally accomplished with the formation of large quantities of diethylene glycol and similar ethers which tend to become part of the polyester chain in the form of aliphatic ether linkages. Such modifications of the polyester chain results in the formation of a polymer which is not generally suitable for filament or fiber production due to its susceptability to hydrolytic action. Additionally, such products also tend to have molecular weights which are below those necessary for acceptable filament-forming polyester resin and they are not sufficiently colorless for textile purposes.

Various combinations of first stage additives and polycondensation catalysts have been suggested heretofore for use in the direct esterification method of preparing polyethylene terephthalate wherein ethylene glycol and terephthalic acid are first esterified to form a prepolymer consisting of bis-2-hydroxyethyl terephthalate or a polycondensation product thereof wherein the D.P. (degree of polymerization) varies from about 2 to about 6, and in the second stage or polycondensation step wherein the product of esterification is polycondensed. However, in general, none of these have proven entirely satisfactory because of the varied problems of ether formation in the polymer chain, prolonged reaction time required, color of resin, and low molecular weight of the resin produced.

Among the first stage additives or ether inhibitors that have been used are, for example, sodium acetate and calcium acetate. The polycondensation step of the prior art is generally accomplished through the use of a conventional polycondensation catalyst, for example, antimony trioxide, and antimony trisulfide.

From a commercial standpoint, it is essential that a polyester resin be produced in the shortest possible time and the desired degree of polymerization be obtained. A polyethylene terephthalate resin suitable for melt spinning should have a carboxyl content value of about or below 50 equivalents per million grams (eq./$10^6$ gr. or meq./kg.) a melting point of about at least 258°–260° C., an intrinsic viscosity preferably not less than about 0.60 (determined in a 60% phenol and 40% tetrachloroethane solution, wt./wt., at 30° C.) and be substantially colorless in order for the filaments formed therefrom to possess a satisfactory level of hydrolytic stability, thermal stability, ultra-violet light stability, good color, and a high degree of tenacity.

It is an object of this invention to prepare polyethylene terephthalate suitable for melt extrusion into non-degraded, processable filaments by the direct esterification reaction between terephthalic acid and ethylene glycol.

Another object of the present invention is to provide an improved method for the production of filament and film-forming polyethylene terephthalate low in ether content and exhibiting little color through the use of a catalytic additive.

These and other objects are accomplished in accordance with the present invention which involves a method for preparing polyethylene terephthalate wherein the terephthalic acid and ethylene glycol are directly esterified and the product of esterification is polycondensed, the improvement comprising carrying out both the direct esterification reaction and the polycondensation of the product of esterification in the presence of a catalytic additive selected from the group having the formulas $MMeF_6$, $M'_xTiF_6$, and $M''Me''F_4$, wherein M represents a substituent selected from the group consisting of an alkali metal and an $NH_4$-group or a substituted $NH_4$-group wherein at least one hydrogen atom of which is substituted with a lower alkyl radical containing 1 to 6 carbon atoms, Me represents a substituent selected from the group consisting of antimony and arsenic, M' represents a substituent selected from the group consisting of an alkali metal, an alkaline earth metal and an $NH_4$-group, $x$ is 1 where M' is a bivalent metal and $x$ is 2 where M' is a monovalent metal or an $NH_4$-group, M'' represents a substituent selected from the group consisting of an alkali metal and an $NH_4$-group, Me'' represents a substituent selected from the group consisting of arsenic and antimony, in an amount sufficient to improve the properties of the resulting polyester.

The catalytic additives that are used in both the direct esterification step and polycondensation step of the present invention may be suitably varied to meet any requirements of reaction conditions and desired product. For example, among the catalytic additives that can be used in accordance with the present method are ammonium hexafluoroantimonate, potassium hexafluoroantimonate, tripropyl ammonium hexafluoroarsenate, ammonium hexafluorotitanate, calcium hexafluorotitanate, potassium hexafluorotitanate, ammonium tetrafluoroantimonite potassium tetrafluoroantimonite, potassium tetrafluoroarsenite or any combination thereof.

Generally, a concentration of the present catalytic additives in the range of from about $5 \times 10^{-8}$ to about $5 \times 10^{-3}$ mole per mole of terephthalic acid in the subject terephthalic acid-ethylene glycol reaction mixture is used in the subject direct esterification method of preparing polyethylene terephthalate. Higher or lower concentrations of the present catalysts can also be used. However, when concentrations less than the above are used, their effectiveness is generally reduced, whereas when concentrations greater than this are used, no further improvement in the present process or desired filament-forming polyester product is generally obtained.

In general, the preparation of filament-forming polyester resin via the direct esterification method is carried out at a molar ratio of ethylene glycol to terephthalic acid from about 1:1 to about 15:1, but preferably from about 1.2:1 to about 2.5:1. However, it is known that with higher proportions of glycol relative to terephthalic acid, the initial esterification is caused to take place more readily. The first stage reaction of the present method is generally carried out at temperatures ranging from about 220° C. to about 290° C. in the absence of an oxygen containing gas at atmospheric or elevated pressure for about two to five hours. For example, the reaction may be carried out in an atmosphere of nitrogen. The second stage or polycondensation step of the present method is generally carried out under reduced pressure within the range of from about 0.05 to 20 mm. of mercury in the absence of an oxygen containing gas, at temperatures from about 260° C. to 325° C. for about two to five hours. When the direct esterification step is completed, as indicated, for example, by the formation of a clear reaction mixture, any remaining glycol is distilled off and the polycondensation step is commenced by changing to the polycondensation reaction conditions cited above.

The catalytic additives of the present method operate both as a first stage additive or ether inhibitor and a polycondensation catalyst in the direct esterification method of preparing polyethylene terephthalate and, therefore, eliminates the need for a two-component system consisting of a first stage additive and a polycon- The process of this invention may be carried out either continuously or batch-wise.

The following examples of several preferred embodiments will further serve to illustrate the present invention. All parts are by weight unless otherwise indicated.

EXAMPLES I–XII

A mixture of terephthalic acid and ethylene glycol at ratios and weights indicated in the following table, and $5 \times 10^{-5}$ mole of a catalytic additive, as listed in the following table with the exact weight used, was charged to a Fischer-Porter pressure assembly equipped with a nitrogen sparge tube and a distilling arm. The reactor was lowered into an oil bath at 260° C. and flushed for ten minutes with dry nitrogen. A nitrogen pressure of 60 p.s.i. was applied and a distillate of water-ethylene glycol was collected. When a clear reaction mixture, i.e. solution, was obtained, the pressure was reduced to atmospheric and the remaining excess glycol was distilled. Then the resulting low molecular weight prepolymer was polycondensed under a nitrogen blanket and at a sub-atmospheric pressure of about 0.3 mm. of mercury at 282° C. to a high molecular weight polyester. The polycondensation reaction times for the various examples are given in the following table.

The following table sets for the conditions and results of various reactions carried out as described above.

TABLE

| Example No. | Catalytic additive | Weight of catalytic additive | Molar ratio [1] of ethylene glycol to terephthalic acid | Esterification, time, hrs:min. | Prepolymer carboxyl content, meq./kg. | Condensation time, hrs. | Intrinsic viscosity | Polymer carboxyl content, meq./kg. | Melting point, °C. |
|---|---|---|---|---|---|---|---|---|---|
| 1 | Ammonium hexafluoroantimonate | .0127 | 1.5:1 | 4:40 | 246 | 4 | .60 | 37 | 261 |
| 2 | do | .0129 | 1.5:1 | 4:25 | 145 | 4 | .80 | 38 | 260 |
| 3 | Potassium hexafluoroarsenate | .0114 | 1.5:1 | 3:15 | 73 | 4 | .61 | 51 | 259 |
| 4 | Tripropyl ammonium hexafluoroarsenate | .0166 | 1.5:1 | 3:20 | 150 | 4 | .60 | 28 | 249 |
| 5 | do | .0166 | 2:1 | 2:00 | 300 | 4 | .80 | 33 | 259 |
| 6 | Ammonium hexafluorotitanate | .0099 | 2:1 | 2:00 | 100 | 4 | .78 | 34 | 258 |
| 7 | do | [2] .00001 | 1.5:1 | 3:15 | 84 | 2 | .70 | 22 | 260 |
| 8 | Calcium hexafluorotitanate | .0101 | 1.5:1 | 4:10 | 390 | 4 | .80 | 33 | 259 |
| 9 | Potassium hexafluorotitanate | .0129 | 1.5:1 | 4:18 | 156 | 4 | .88 | 40 | 262 |
| 10 | Ammonium tetrafluoroantimonite | .0108 | 1.5:1 | 3:40 | 170 | 4 | .78 | 36 | 259 |
| 11 | Potassium tetrafluoroantimonite | .0118 | 1.5:1 | 4:15 | 157 | 4 | .64 | 39 | 261 |
| 12 | Potassium tetrafluoroarsenite | .0095 | 1.5:1 | 3:55 | 278 | 4 | .64 | 35 | 258 |

[1] In the above examples, where a 1.5:1 molar ratio of ethylene glycol to terephthalic acid is indicated, about 53.4 gm. ethylene glycol and 96.6 gm. terephthalic acid was present in the reaction mixture. Where a 2:1 molar ratio of ethylene glycol to terephthalic acid is indicated, about 62 gm. ethylene glycol and 84 gm. of terephthalic acid was present in the reaction mixture.
[2] $5 \times 10^{-8}$ mole of catalytic additive used in this reaction mixture.

densation catalyst. However, it is within the scope of the present invention, if indicated, to use catalytic amounts of known first stage direct esterification additives or polycondensation catalysts in combination with the catalytic additives of the present invention to produce polyethylene terephthalate resin having varying properties.

Further, the present invention also includes within its scope the process of preparing polyethylene terephthalate from a polyethylene terephthalate prepolymer comprising bis-2-hydroxyethyl terephthalate or a polycondensation product thereof wherein the D.P. varies from about 2 to 6 (prepared by the method disclosed herein or by any other known process, such as transesterification from dimethyl terephthalate and ethylene glycol) by condensing the said prepolymer in the presence of a catalytic additive of the present invention. It has been determined that the above disclosed ammonium and alkyl substituted ammonium derivatives of hexafluoroantimonate, hexafluoroarsenate, hexafluorotitanate, and tetrafluoroantimonite are particularly effective in the polycondensation of the subject polyester prepolymers in view of the excellent properties of the resulting resin products. By the use of such catalytic additives, there is necessarily only a very small quantity of metal in the polyester polymers produced which is very desirable for many uses of polyester resin, such as in the manufacture of films. A concentration of the catalytic additives of the present invention ranging from about 0.004% to about 0.2%, based on the weight of the polyester prepolymer to be polycondensed, is generally used.

EXAMPLE XIII

Twenty-five grams of bis-2-hydroxyethyl terephthalate was charged into a reaction vessel and polycondensed in the presence of 0.0019 gram of ammonium hexafluorotitanate under a vacuum of about 0.3 mm. of mercury at 282° C. for three hours. The resulting polyester resin had an intrinsic viscosity of 0.86 and a carboxyl content value of 26 (meq./kg.).

The results shown on the above table indicate that the catalytic additives of the present method act as both an ether inhibitor in the first stage of the direct esterification method of preparing polyethylene terephthalate and also as a polycondensation catalyst in the second stage. The results indicate that the prepolymers of the present method are highly esterified products, as indicated by their low carboxyl content values. The finished polyester resins of the present invention are characterized by their low carboxyl numbers and high intrinsic viscosities and melting points which indicate that the polyester resins are suitable for producing polyester filaments by the melt extrusion technique. Additionally, all of the resin products of the above examples are either pale white or pale off-white in color and thus, were very desirable colorwise. Thus, these resin products can also be used for the production of films.

The intrinsic viscosity of the polyester resin products of the above examples were measured in a 60% phenol and 40% tetrachloroethane solution (wt./wt.) at 30° C. The other analytical values shown in the above examples were determined by conventional laboratory procedures.

The process of the present invention has been described with particular reference to polyethylene terephthalate, but it will be obvious that the present invention includes within its scope other polymeric polymethylene terephthalates formed from glycols of the series $HO(CH_2)_nOH$, wherein $n$ is 2 to 10 and terephthalic acid and copolyesters containing varied amounts of other suitable dicarboxylic acids such as isophthalic acid.

We claim:

1. In a method of preparing polyethylene terephthalate resin wherein terephthalic acid and ethylene glycol are directly esterified to form a polyethylene terephthalate prepolymer product of esterification comprising bis-2-hydroxyethyl terephthalate and the said prepolymer is polycondensed, the improvement comprising catalyzing both the direct esterification reaction and the polycondensation of said prepolymer with a catalytic amount of a catalytic additive having a formula selected from the group consisting of $MAsF_6$, $NH_4SbF_6$, $M'_xTiF_6$ and $M''Me''F_4$ wherein M represents a substituent selected from the group consisting of an alkali metal, and an $NH_4$-group or a substituted $NH_4$-group wherein at least one hydrogen atom of which is substituted with a lower alkyl radical containing from 1 to 6 carbon atoms, M' represents a substituent selected from the group consisting of an alkali metal and an alkaline earth metal and an $NH_4$-group, $x$ is 1 where M' is an alkaline earth metal and $x$ is 2 where M' is selected from the group consisting of an alkali metal and an $NH_4$-group, M" represents a substituent selected from the group consisting of an alkali metal and an $NH_4$-group, Me" represents a substituent selected from the group consisting of arsenic and antimony.

2. The method of claim 1 wherein the additive is present in an amount ranging from about $5\times10^{-8}$ to about $5\times10^{-3}$ mole per mole of terephthalic acid.

3. The method of claim 1 wherein the additive is ammonium hexafluoroantimonate.

4. The method of claim 1 wherein the additive is potassium hexafluoroarsenate.

5. The method of claim 1 wherein the additive is tripropyl ammonium hexafluoroarsenate.

6. The method of claim 1 wherein the additive is ammonium hexafluorotitanate.

7. The method of claim 1 wherein the additive is calcium hexafluorotitanate.

8. The method of claim 1 wherein the additive is potassium hexafluorotitanate.

9. The method of claim 1 wherein the additive is ammonium tetrafluoroantimonite.

10. The method of claim 1 wherein the additive is potassium tetrafluoroantimonite.

11. The method of claim 1 wherein the additive is potassium tetrafluoroarsenite.

12. A method of preparing polyethylene terephthalate resin comprising polycondensing a reaction mixture consisting essentially of bis-2-hydroxyethyl terephthalate with a catalytic amount of a catalyst selected from the group consisting of ammonium hexafluoroantimonate, tripropyl ammonium hexafluoroarsenate, ammonium hexafluorotitanate, and ammonium tetrafluoroantimonite.

References Cited

UNITED STATES PATENTS

| | | | |
|---|---|---|---|
| 3,068,204 | 12/1962 | Perry et al. | 260—75 |
| 3,329,651 | 7/1967 | Dobinson | 260—75 |
| 3,359,241 | 12/1967 | Dobinson | 260—75 |

WILLIAM H. SHORT, Primary Examiner

L. P. QUAST, Assistant Examiner

U.S. Cl. X.R.

260—475

UNITED STATES PATENT OFFICE
CERTIFICATE OF CORRECTION

Patent No. 3,554,978      Dated January 12, 1971

Inventor(s)  Mary E. Carter et al.

It is certified that error appears in the above-identified patent and that said Letters Patent are hereby corrected as shown below:

Column 2, line 56, before "po-" insert a comma. Column 4 line 26, "for the" should read -- forth --. Columns 3 and in the TABLE, Example No. 2, "do" should read -- Potassium Hexafluoroantimonate --; Example No. 3, "Potassiun" should read -- Potassium --; Example No. 4, "150" under sixth heading, should read -- 140 --.

Signed and sealed this 16th day of November 1971.

(SEAL)
Attest:

EDWARD M.FLETCHER,JR.         ROBERT GOTTSCHALK
Attesting Officer             Acting Commissioner of Paten